(12) United States Patent
Min

(10) Patent No.: US 8,385,020 B2
(45) Date of Patent: Feb. 26, 2013

(54) MODIFIED SHIELD DESIGN TO ELIMINATE THE FAR-FIELD WATE PROBLEM

(75) Inventor: Tai Min, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 287 days.

(21) Appl. No.: 12/927,797

(22) Filed: Nov. 24, 2010

(65) Prior Publication Data

US 2012/0127611 A1    May 24, 2012

(51) Int. Cl.
*G11B 5/127* (2006.01)

(52) U.S. Cl. .................................. 360/125.3

(58) Field of Classification Search ........ 360/125.3, 360/125.03, 317, 125.09, 125.04, 123.1, 360/125.17, 125.12, 125.16, 125.06, 125.15, 360/125.26, 125.71; 29/603.15, 603.16, 29/603.07
See application file for complete search history.

(56) References Cited

U.S. PATENT DOCUMENTS

| | | | |
|---|---|---|---|
| 6,785,097 B2 | 8/2004 | Okada et al. | |
| 7,538,976 B2 | 5/2009 | Hsiao et al. | |
| 7,599,152 B2 | 10/2009 | Guan et al. | |
| 7,768,741 B2 | 8/2010 | Feng | |
| 8,164,853 B2* | 4/2012 | Hirata et al. | 360/125.3 |
| 2007/0230045 A1 | 10/2007 | Hsiao et al. | |
| 2008/0112081 A1* | 5/2008 | Matono | 360/125.08 |
| 2009/0262464 A1 | 10/2009 | Gill et al. | |
| 2011/0157746 A1* | 6/2011 | Hirata et al. | 360/119.04 |
| 2011/0216443 A1* | 9/2011 | Hirata et al. | 360/123.12 |

OTHER PUBLICATIONS

"Side-Track Erasure Processes in Perpendicular Recording," by Shaoping Li et al., IEEE Transactions on Magnetics, vol. 42, No. 12, Dec. 2006, pp. 3874-3879.
"High Density Perpendicular Recording with Wrap-Around Shielded Writer," by Daniel Z. Bai et al, TMRC 2009, Paper B4, pp. 1-9, Manuscript received Aug. 24, 2009.
"One Terabit per Square Inch Perpendicular Recording Conceptual Design," by M. Mallary et al., IEEE Transactions on Magnetics, vol. 38, No. 4, Jul. 2002, pp. 1719-1724.

* cited by examiner

*Primary Examiner* — Allen Cao

(74) *Attorney, Agent, or Firm* — Saile Ackerman LLC; Stephen B. Ackerman

(57) ABSTRACT

A shield design for a magnetic write head is described that eliminates the far-field WATE problem while still maintaining side shielding ability. This is achieved by moving all but the central sections of the three shields (LS, SS, and WS) and, optionally, the top yoke a short distance further away from the recording medium than the ABS.

19 Claims, 8 Drawing Sheets

FIG. 1 - Prior Art

MODIFIED SHIELD DESIGN TO ELIMINATE THE FAR-FIELD WATE PROBLEM

FIELD OF THE INVENTION

The invention relates to the general field of magnetic data recording with particular reference to dealing with the wide area track erasure problem.

BACKGROUND OF THE INVENTION

In today's high density magnetic recording art, the number of tracks per inch (TPI) has been increasing rapidly. To avoid erasure of adjacent tracks during data writing and to shield the main writing pole fringing fields, a side shield (SS) was added. Recently, a wrap-around shield (WAS) writer comprising a trailing shield together with side shields, as shown in FIG. 1 [1~3] has been extensively studied, and is utilized in products to enable the areal recording density of hard disk drives to continue to grow.

There is, however, a problem associated with the side shield and WAS designs: wide area track erasure (WATE). When the writer is writing the data track, some percentage of heads can erase data several tracks away, usually after several cycles of write operation. WATE can occur from 1 to 10 μm away from the main writing pole location.

FIG. 2 shows some characteristics of WATE: the degraded bit error rate (BER) as a function of offset position to the main pole of 10 heads (each line is one head) was measured. The y-axis is the amount of BER degradation after the recording head has written on the central track for a certain amount of cycles. The x-axis is the offset from the center of the write pole. The write pole's (track) magnetic width is around 0.1 μm. It is obvious that some heads show strong erasure features at 1.2-1.5 μm away from the main pole. This far-track erasure phenomenon is detrimental to the disk drive reliability since the data not intended to be erased at those positions (1.2-1.5 μm away from the central track) can be accidentally erased. Testing for far-track WATE prior to drive-build is economically prohibitive so pre-screening is not an option. Solutions must therefore be found that eliminate these WATE peaks. Some of the root causes of WATE have been discovered [1-3], but many remain unknown at present.

1) Daniel Z. Bai, et. al. "High Density Perpendicular Recording with Wrap-Around Shielded Writer", TMRC 2009, Paper B4
2) M. Mallary et. al, "One terabit per square inch perpendicular recording conceptual design", IEEE Trans. Magn., vol. 38, pp. 1719-1724, July 2002.
3) S. Li, et. al. "Side track erasure processes in perpendicular recording", IEEE Trans. Magn., vol. 42, pp. 3874-3879, December 2006.

A routine search of the prior art was performed with the following references of interest being found:

In U.S. Pat. No. 7,538,976, Hsiao et al. teach a tapered trailing shield to prevent wide angle track erasure while in U.S. 2007/0230045, Hsiao et al. disclose recessed shield portions to prevent WATE. Guan et al. (Headway) show shields having recessed edges to avoid concentration of flux at the edges in U.S. Pat. No. 7,599,152. Okada et al. describe recessed shields to prevent leaking of the magnetic field in U.S. 2003/0026039. In U.S. 2009/0262464, Gill et al. disclose a wrap-around shield made of low-permeability material to reduce WATE while in U.S. 2007/0268623 Feng teaches a multi-layer pole structure to reduce WATE.

SUMMARY OF THE INVENTION

It has been an object of at least one embodiment of the present invention to provide a method for eliminating far-field WATE while still maintaining side shielding ability.

Another object of at least one embodiment of the present invention has been to describe a magnetic write head that embodies said method.

Still another object of at least one embodiment of the present invention has been to describe a process for the manufacture of said write head.

These objects have been achieved by moving all but the central section of the three shields (leading shield LS, side shield SS, and write shield WS) and, optionally, the top yoke, a short distance (typically between 0.02 and 0.05 microns) inwards i.e. further away from the recording medium than the ABS.

DESCRIPTION OF THE PREFERRED EMBODIMENTS

Figure 1:
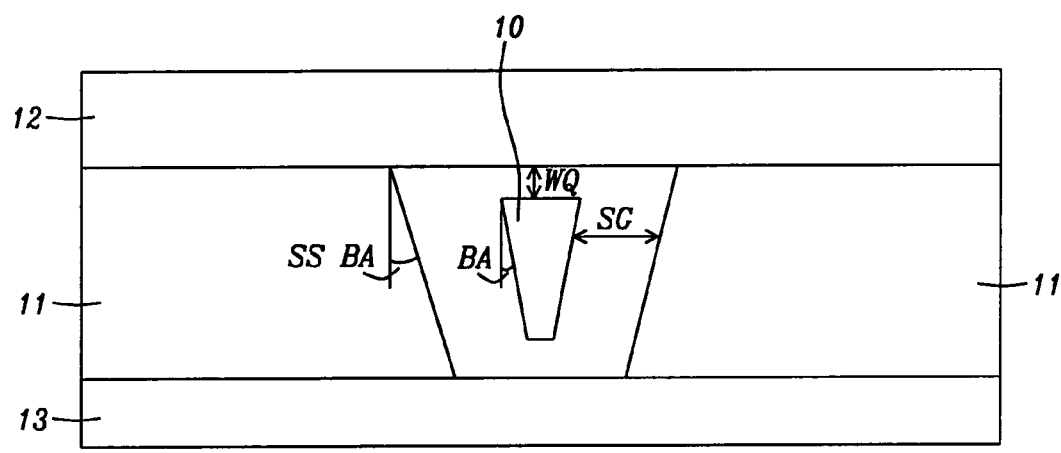
FIG. 1. Schematic drawing of air-bearing-surface (ABS) view of a wrap-around writer design (original FIG. 1).
Figure 2:
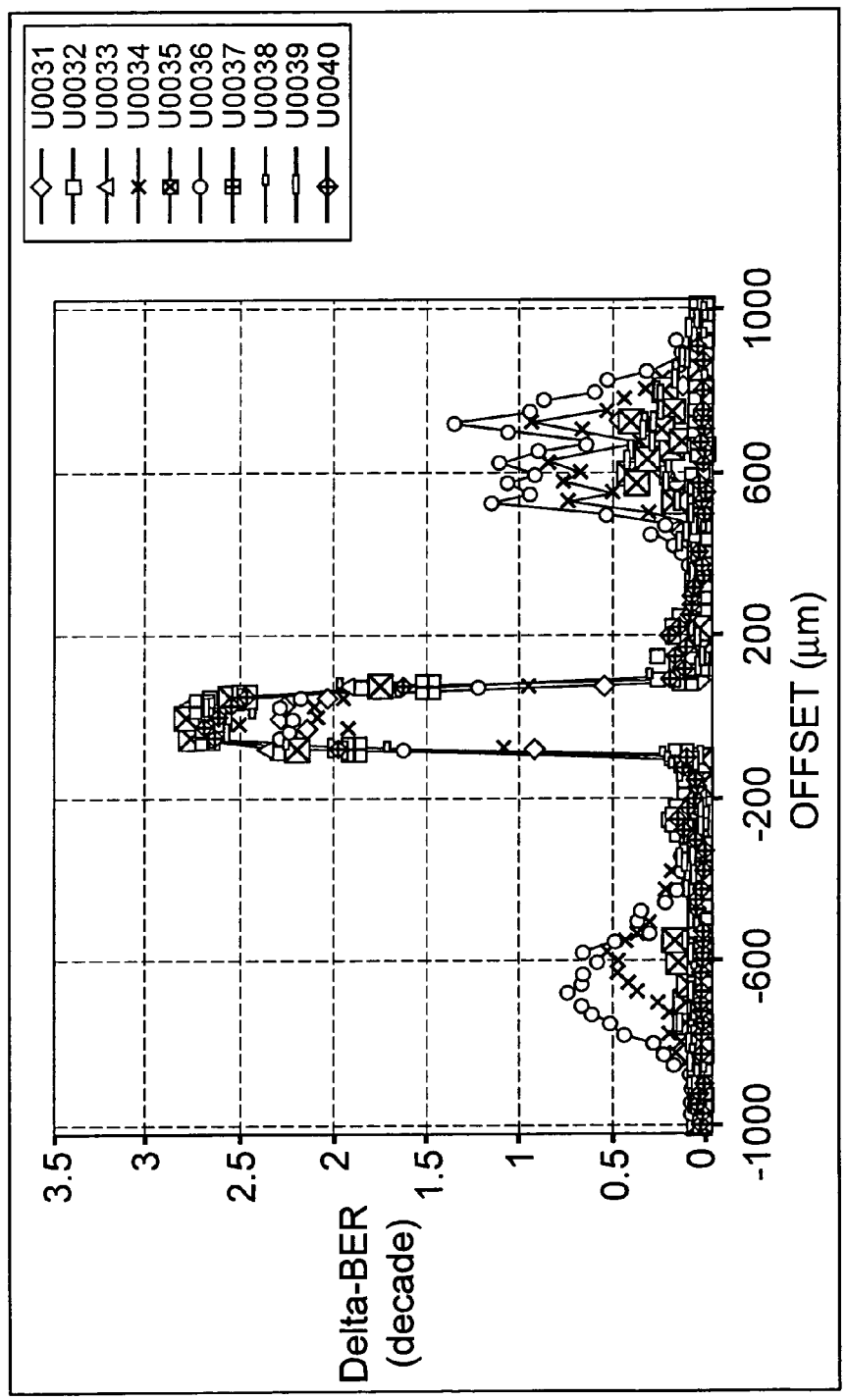
FIG. 2. Measured cross-track delta BER after central track erasure, the WATE is apparent in the 0.5-0.9 μm region for this case. Each graph point symbol represents a single head.
Figure 3A:
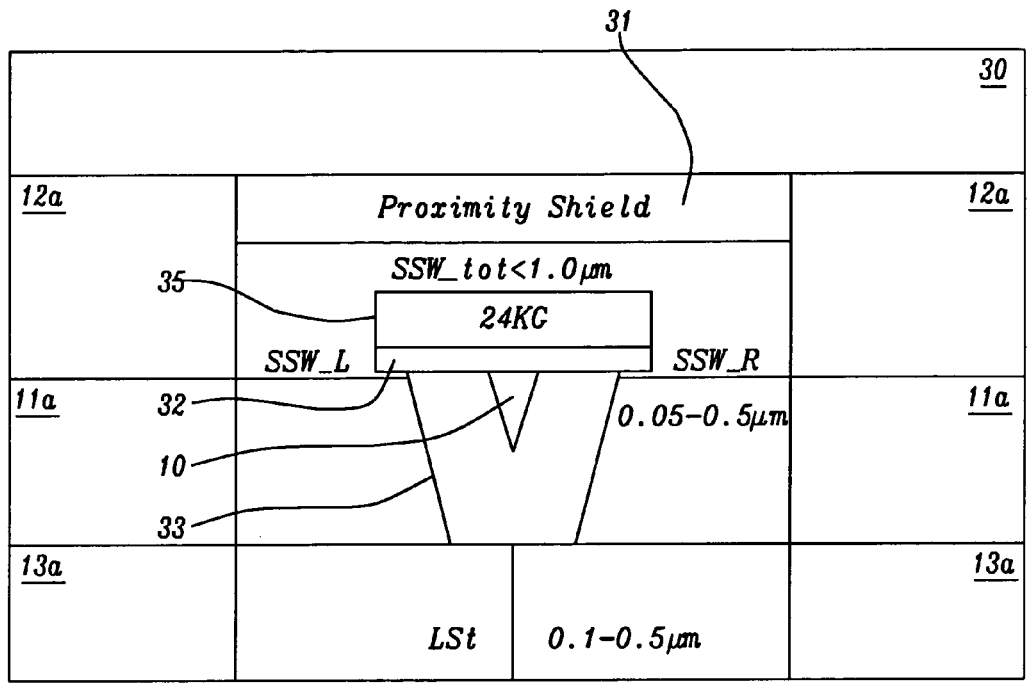
FIG. 3a. ABS view of general Proximity Shield Design (PSD)#1.

The invention discloses a novel design (the proximity shield design or PSD) and processes to implement it. The purpose of the PSD is to completely eliminate far-field wide area track erasure or WATE. As discussed below in relation to FIG. 3, the key feature of the invention that leads to the elimination of far-field WATE is a slight recession, or displacement, of the magnetic shields away from the ABS (and recording medium) except in the immediate vicinity of the main pole.

In this way the proximity magnetic shield will still continue to prevent fringe fields generated during write operations from reaching the recording medium while the increased distance of the recessed magnetic shields from the magnetic media will reduce any disturb fields originating in the recessed region to a low enough level to avoid accidental erasure.

The width of the proximity shield (PS) is in the range of 0.05-0.5 µm per side. For a track width of 0.05-0.1 µm, the proximity shield thus covers only 1 to 10 tracks per side, so all WATE peaks beyond the outer edge of the proximity shield will be eliminated. Additionally, the disk drive already has a build-in function which re-writes ~10 adjacent tracks after some number of write cycles and/or on detection of signal degradation on adjacent tracks.

However, this adjacent track re-writing scheme alone cannot take care of the far-field WATE problem since it can occur anywhere from nearby to more than 100 tracks away. Also, the location of far-track WATE peaks can vary greatly from one head to another. In FIG. 3, LS refers to 'leading (magnetic) shield', SS to 'side shield', and WS to 'write shield'. The write gap and side gap are of non-magnetic material. The top yoke is the magnetic layer that wraps around the write coil to complete the write flux loop.

Only the sections near the main pole are shown here. The full recessed region extends all the way to the outer edges of the LS, SS, and WS. The amount of recess depends on the detailed design requirements and process limitations to achieve the selected PSD. The typical minimum value is 5 nm. The greater the recessed amount, the less the chance of WATE caused by undesired magnetic activity in the LS, SS, and WS.

Figure 3B:
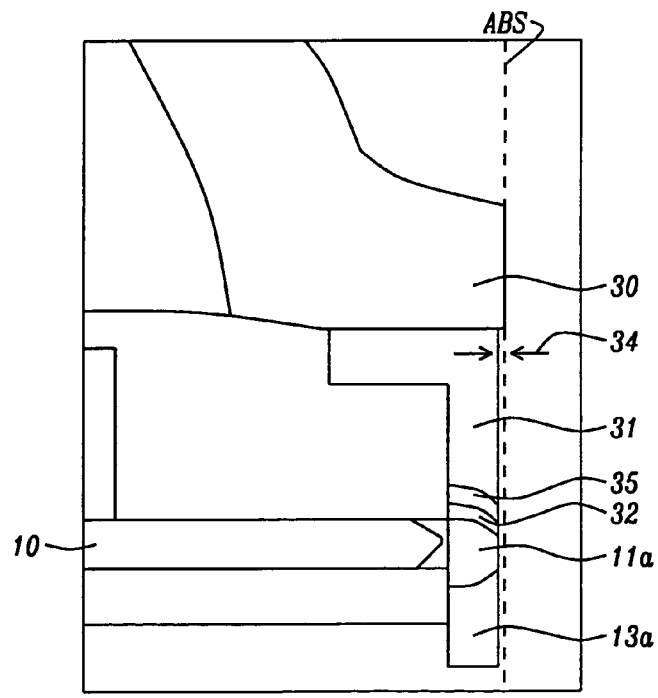
FIG. 3b. Cross-section view of PSD#1 outside of the PSD region (off main port center).

The first embodiment of the invention (PSD#1 shown in FIGS. 3a and 3b) has a straight proximity shield with non-recessed top. FIG. 3b is a cross-section made in a plane normal to the ABS and showing recessed depth 34 as well as proximity shield 31, seed layer 35, write gap 32, main pole 10 side shield 11a, and leading shield 13a.

Figure 4A:
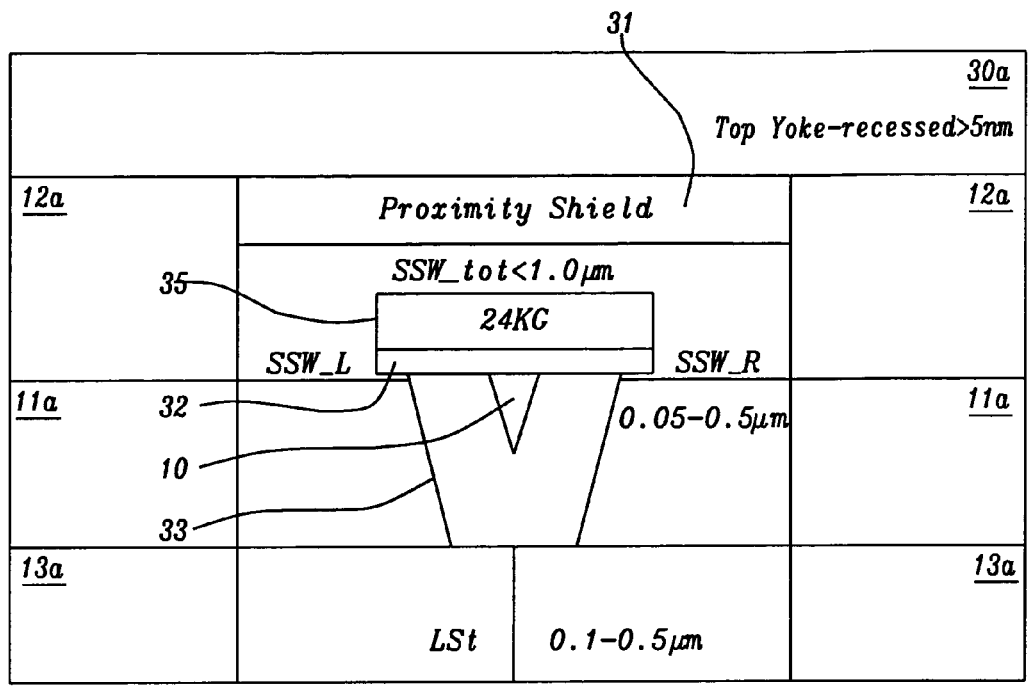
FIG. 4a. ABS view of PSD#.
Figure 4B:
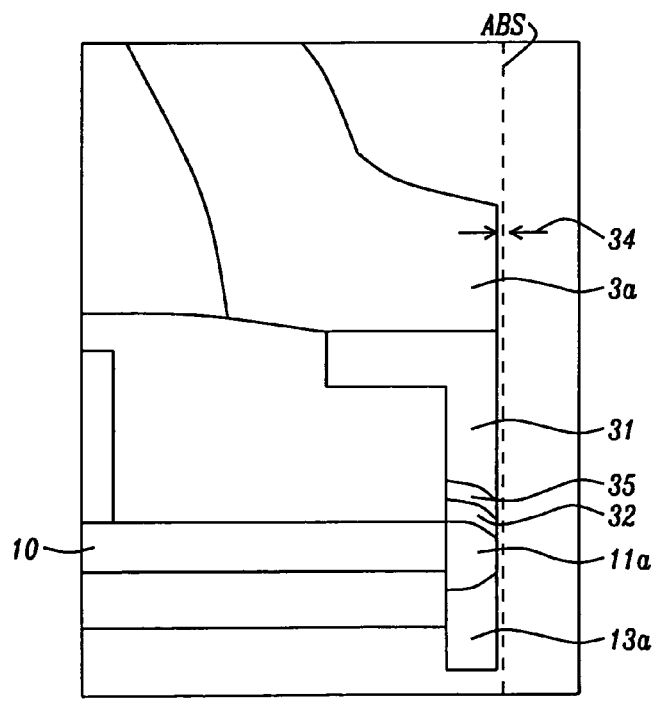
FIG. 4b. Cross-section view of PSD#2 outside of the PSD region (off main port center).

PSD#2, shown in FIGS. 4a and 4b has its top yoke recessed as well as LS, SS, and WS.

Figure 5A:
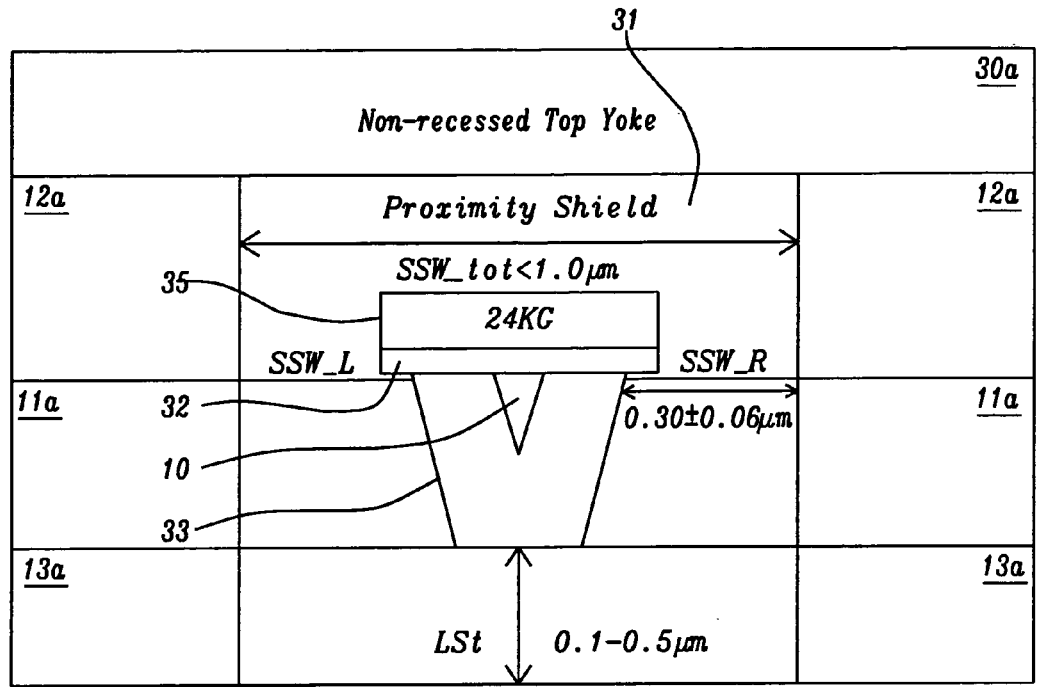
FIG. 5a. ABS view of PSD#3 with non recessed region forming a straight bar across the top yoke.
Figure 5B:
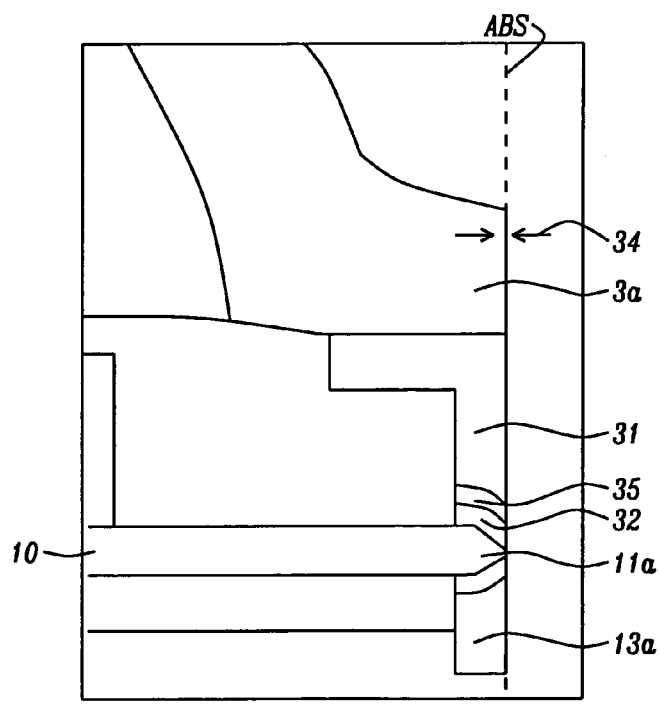
FIG. 5b. Cross-section view of PSD#3 at the center line of the main pole.
Figure 5C:
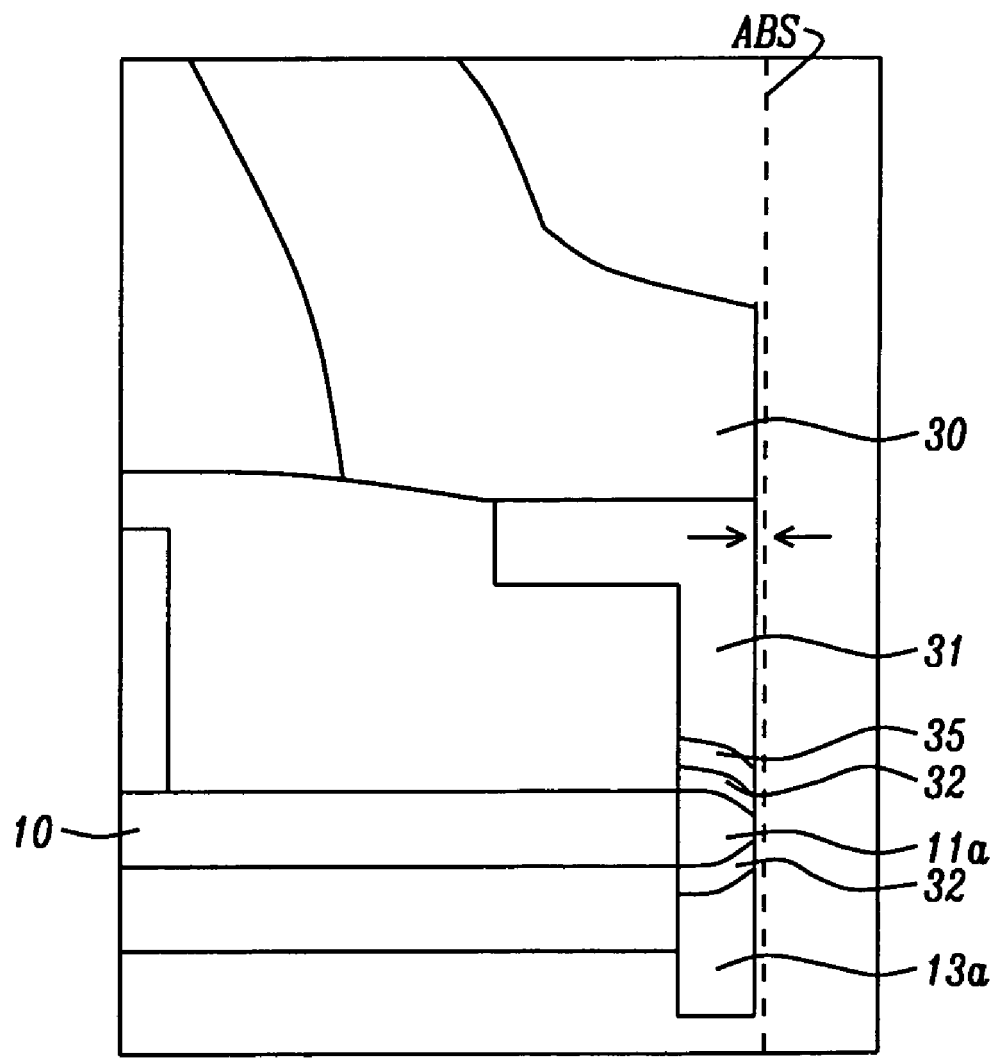
FIG. 5c. Cross-section view of PSD#3 off the PSD region.

PSD#3, shown in ABS view in FIG. 5a, has a non-recessed central section 5b and recessed outer sections 5c in a similar manner to LS, SS, and WS.

Figure 6A:
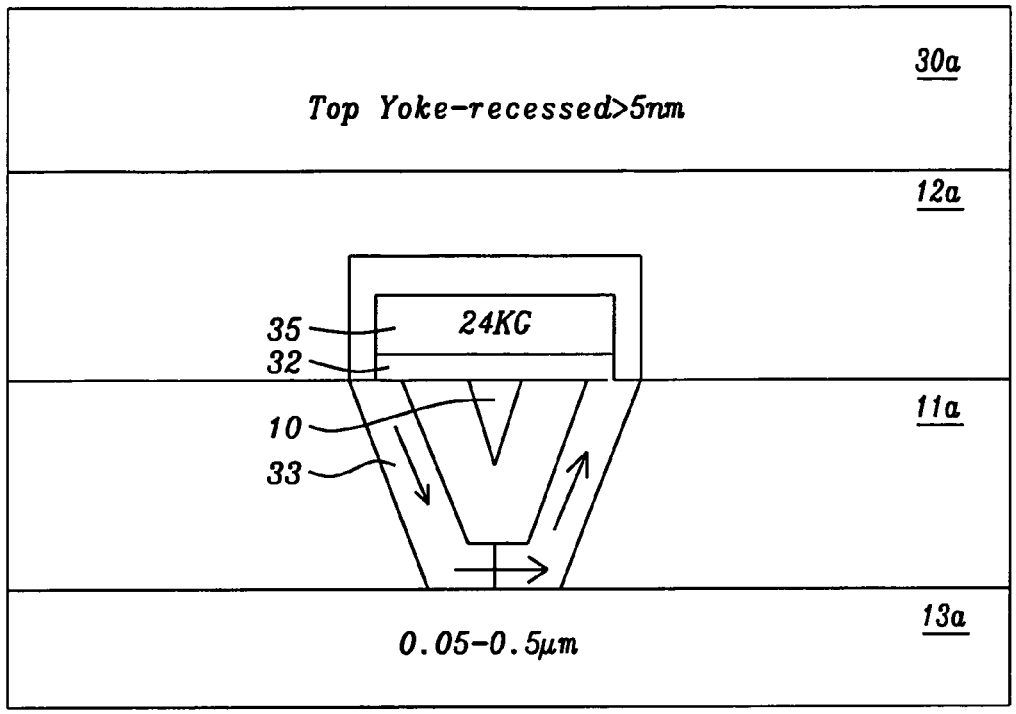
FIG. 6a. ABS view of PSD#4 with non recessed region conforming to the side and write gaps of the main pole.

PSD#4, shown in ABS view in FIG. 6a, has the proximity shields in the LS and SS regions conforming to the shape of the side and write gaps. An important feature of this design is that the magnetization of the proximity shield in the LS and SS regions is aligned to the edges of the side gap, as indicated by the arrows. This layout of the magnetization has the advantage of being an effective shield to reduce side fringing while continuing to prevent flux from the proximity shield from passing through the ABS, thereby reducing the likelihood of accidental erasure.

Figure 6B:
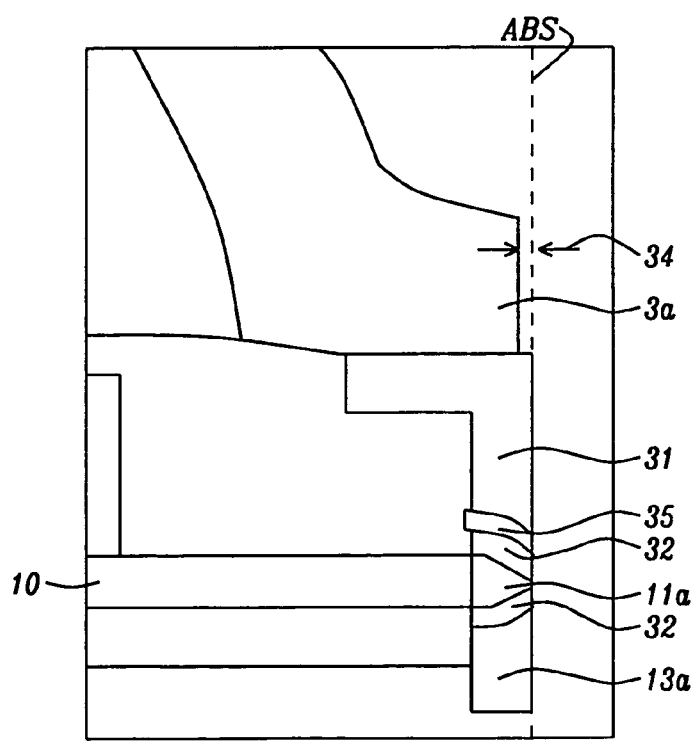
FIG. 6b. Cross-section view of PSD#4 at the center line of the main pole.
Figure 7:
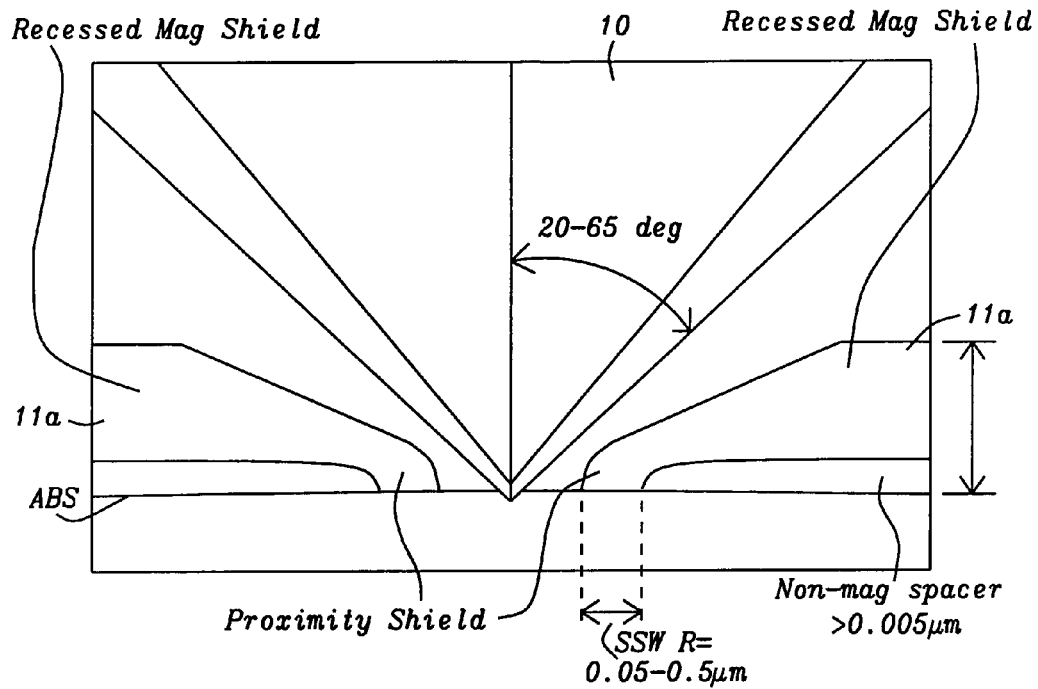
FIG. 7. Schematic view of the main pole looking down on the main pole top surface of the PSD with the recessed region forming a straight line bar for the full LS/SS/WS or top yoke width (along the horizontal direction).

A cross-sectional view of PSD#4 is shown in FIG. 6b (cut made through the center of the main pole). FIG. 7 is a schematic view taken looking down on the main pole top surface of the PSD with the recessed region forming a straight bar for the full LS/SS/WS or top yoke width (along the horizontal direction).

Manufacture of the PSDs:

The two processes that we have employed to manufacture the preferred embodiments listed above are:
1) filling the portion between the recessed magnetic shields and the ABS with non-magnetic material;
2) providing a suitably shaped mask to protect the main pole and proximity shield of the writer as well as the entire reader structure and then ion milling a cavity to a depth of at least 5 nm to form the desired recession of the leading, side, and write shields (LS/SS/WS) as well as the top yoke.

For the First Process:

Non-magnetic material 71 is deposited to replace the LS/SS/WS material that was removed near the ABS by ion milling, as illustrated in the top view of the main pole surface seen in FIG. 7. This non-magnetic material can be a dielectric or a semiconductor such as (but not limited to) $Al_2O_3$, $SiO_2$, MgO, Si, or Ge et. al by a suitable deposition process such as chemical vapor deposition (CVD) or it could be a non-magnetic metal or alloy such as (but not limited to) Ta, V, Zr, Cr, Rh, or any of the non-magnetic alloys of Ni and/or Fe and/or Co with (but not limited to) V, Cr, Ta, or Rh deposited by (but not limited to) CVD, sputtering or electrodeposition.

Note that since the non-magnetic material will be part of the ABS, its adhesion to the recessed magnetic shields may not be strong enough. This poses a reliability concern of cracking or of a small piece breaking loose and then falling into the disk drive environment and causing mechanical contact between the head and the recording media.

Figure 8:
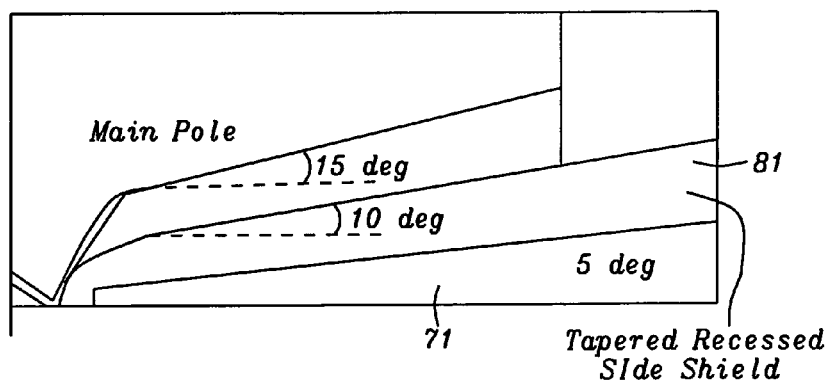
FIG. 8. Schematic view illustrating tapered shield design that increases volume of non-magnetic material between it and the ABS.

This problem has been solved by using the tapered PSD design illustrated in FIG. 8. This design increases the volume of non-magnetic material located some distance away from the main pole area, thereby increasing both the overall adhesion and the mechanical strength of the non-magnetic layer, whereby the non-magnetic layer is better able to resist deleterious effects of thermal cycling including forming unintended mechanical contacts inside the disk drive.

For the Second Process:

Another method to realize the PSD design includes ABS trimming. At row bar level, after the head has been lapped, additional photo patterning and ion milling are applied as follows:

Photoresist is applied and patterned to protect the reader and the non recessed area while leaving the recessed area unprotected.

Etching is then performed at the slider level. After final lapping, the wafer is sliced into multiple rows, there being a number of heads per row. Each slider row is then aligned and internally bonded with its ABS facing up. After a photoresist mask has been applied to protect the proximity shield and reader, ion-milling or wet-etching process is used to remove at least 5 nm in the unprotected region so as to form the recessed region in the LS/SS/WS/Top yoke. After stripping the photoresist and cleaning, processing of the slider continues in the normal way.

What is claimed is:

1. A method to eliminate wide area track erasure (WATE) in a perpendicular magnetic write head having a recording medium, an air bearing surface (ABS), a main pole, a write shield, a side shield, a lead shield, side gap edges, and a top yoke, comprising:
   partitioning each of said shields into opposing pairs of contiguous first and second sections only, said first section being closer to said main pole than said second section;
   partitioning said yoke into a single central section flanked by an opposing pair of outer sections;
   for each of said shields, moving only said second sections a first distance away from both the ABS and the recording medium; and
   thereby reducing to insignificance any disturb fields originating at said second section while continuing to prevent fringe fields generated during write operations from reaching the recording medium.

2. The method recited in claim 1 wherein said second section begins between 0.05 and 20 microns from said main pole's center.

3. The method recited in claim 1 wherein said second section begins between 0.2 and 20 microns from said main pole's center.

4. The method recited in claim 1 wherein said first distance from both the ABS and the recording medium is between 0.0001 and 0.5 microns.

5. The method recited in claim 1 wherein said first distance from both the ABS and the recording medium is between 0.0005 and 0.2 microns.

6. The method recited in claim 1 wherein no part of said top yoke is moved.

7. The method recited in claim 1 further comprising moving all of said top yoke said first distance away from both the ABS and the recording medium.

8. The method recited in claim 1 further comprising moving only said outer sections of said top yoke said first distance away from both the ABS and the recording medium.

9. The method recited in claim 1 further comprising aligning said write shield, side shield, and lead shield relative to said side gap edges thereby reducing side fringing.

10. A perpendicular magnetic write head having a recording medium, an air bearing surface (ABS), a main pole, a write shield, a side shield, a lead shield, and a top yoke, comprising:

each of said shields further comprising opposing pairs of contiguous first and second sections only, said first section being closer to said main pole than said second section;

said yoke having a single central section flanked by an opposing pair of outer sections;

for each of said shields, said first section having a first surface that is coplanar with the ABS and each second section having a second surface that faces the ABS and is a first distance further away the ABS than said first surface; and whereby any disturb fields originating at said second surface are reduced to insignificance at the recording medium and fringe fields generated during write operations are prevented from reaching the recording medium.

11. The perpendicular magnetic write head described in claim 10 wherein said second section begins between 0.05 and 20 microns from said main pole's center.

12. The perpendicular magnetic write head described in claim 10 wherein said second section begins between 0.2 and 20 microns from said main pole's center.

13. The perpendicular magnetic write head described in claim 10 wherein said first distance further away the ABS is between 0.001 and 0.5 microns.

14. The perpendicular magnetic write head described in claim 10 wherein said first distance further away from the ABS is between 0.002 and 0.2 microns.

15. The perpendicular magnetic write head described in claim 10 wherein a surface of said top yoke that faces the recording medium lies entirely on the ABS.

16. The perpendicular magnetic write head described in claim 10 wherein a surface of said top yoke that faces the recording medium is said first distance further away from the recording medium than the ABS.

17. The perpendicular magnetic write head described in claim 16 wherein only said outer sections of said top yoke are said first distance further away from both the ABS and the recording medium.

18. The perpendicular magnetic write head described in claim 10 wherein said write shield, side shield, and lead shield are aligned relative to said side gap edges whereby side fringing is reduced.

19. The perpendicular magnetic write head described in claim 10 wherein said side shield slopes upwards away from the ABS and the main pole whereby non magnetic material between said side shield and the ABS has a greater volume and a reduced probability of cracking.

* * * * *